(12) United States Patent
Garces

(10) Patent No.: US 9,531,907 B2
(45) Date of Patent: Dec. 27, 2016

(54) METHOD FOR SELECTING SHEET FEED PORTION FOR IMAGE FORMATION, IMAGE FORMING APPARATUS, AND INFORMATION PROCESSING APPARATUS

(71) Applicant: KYOCERA Document Solutions Inc., Osaka-shi, Osaka (JP)

(72) Inventor: Patricia Ysabel Garces, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/055,348

(22) Filed: Feb. 26, 2016

(65) Prior Publication Data

US 2016/0269587 A1    Sep. 15, 2016

(30) Foreign Application Priority Data

Mar. 11, 2015    (JP) .................................. 2015-047931

(51) Int. Cl.
| | |
|---|---|
| H04N 1/00 | (2006.01) |
| H04N 1/23 | (2006.01) |
| G06K 15/16 | (2006.01) |
| G06F 3/12 | (2006.01) |
| H04N 1/32 | (2006.01) |
| H04N 1/44 | (2006.01) |

(Continued)

(52) U.S. Cl.
CPC ........ *H04N 1/32144* (2013.01); *G06F 3/1204* (2013.01); *G06F 3/1219* (2013.01); *G06F 3/1243* (2013.01); *G06K 9/00469* (2013.01); *G06K 15/16* (2013.01); *G06K 15/1806* (2013.01); *G06K 15/1823* (2013.01); *G06K 15/4025* (2013.01); *G06K 15/4065* (2013.01); *H04N 1/00623* (2013.01); *H04N 1/00663* (2013.01); *H04N 1/2353* (2013.01); *H04N 1/4406* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,206,360 B1 | 3/2001 | Urata et al. | |
| 6,646,758 B1 * | 11/2003 | Anderson | G06K 15/00 358/1.15 |

(Continued)

FOREIGN PATENT DOCUMENTS

JP    11189351 A    7/1999

*Primary Examiner* — Scott A Rogers
(74) *Attorney, Agent, or Firm* — Alleman Hall McCoy Russell & Tuttle LLP

(57) ABSTRACT

An image forming apparatus or an information processing apparatus obtains information-corresponding-to-keyword representing a correspondence relationship between a keyword, and each of a plurality of sheet feed portions. Further, the information processing apparatus or the image forming apparatus detects the keyword included in the information-corresponding-to-keyword, from at least two of three data that are subject-to-be-printed data, additional text data, and a digital watermark which are included in a print job. Further, the information processing apparatus or the image forming apparatus selects the sheet feed portion associated with the keyword detected in the information-corresponding-to-keyword, as a feed source of a sheet material for execution of the print job.

7 Claims, 9 Drawing Sheets

(51) Int. Cl.
    *G06K 15/02*     (2006.01)
    *G06K 9/00*     (2006.01)
    *G06K 15/00*     (2006.01)

(56) References Cited

U.S. PATENT DOCUMENTS

| | | | | |
|---|---|---|---|---|
| 6,781,708 | B1* | 8/2004 | Wada | G06F 3/1204 358/1.12 |
| 6,817,794 | B2* | 11/2004 | Kakutani | B65H 3/44 271/9.06 |
| 6,952,726 | B1* | 10/2005 | White | G06F 9/5044 709/224 |
| 7,148,977 | B2* | 12/2006 | Zerza | G06F 3/1208 358/1.14 |
| 7,546,056 | B2* | 6/2009 | Konno | B41J 3/60 399/82 |
| 8,139,238 | B2* | 3/2012 | Oki | B41J 11/485 271/9.01 |
| 8,375,215 | B2* | 2/2013 | Powers | G06F 3/1204 235/382 |
| 9,058,555 | B2* | 6/2015 | Kanamoto | G06F 3/1204 |
| 9,230,203 | B2* | 1/2016 | Koike | G06K 15/1894 |
| 9,311,579 | B2* | 4/2016 | Shirane | B65H 1/04 |
| 9,406,007 | B2* | 8/2016 | Murata | G06K 15/4065 |
| 2007/0150968 | A1* | 6/2007 | Chiba | H04N 1/00846 726/31 |
| 2008/0084020 | A1* | 4/2008 | Nakamura | B41J 11/485 270/1.01 |
| 2015/0170012 | A1* | 6/2015 | Iwasawa | G06K 15/4065 358/1.12 |

* cited by examiner

| Cassette Number | Size | Quality | Orientation | Priority |
|---|---|---|---|---|
| 1 | A4 | Plain Paper | Portrait Orientation | 1 |
| 2 | A4 | One-Side Printed Paper | Landscape Orientation | 2 |
| 3 | A3 | Plain Paper | Portrait Orientation | 3 |
| 4 | Letter | High Quality Paper | Landscape Orientation | 4 |

FIG. 9

| Cassette Number | Keyword |
|---|---|
| 1 | ("ppp" or "qqqq") |
| 2 | ("rr" and "ssss") |
| 3 | ("ttt") |
| 4 | ("uuuu") |

FIG. 10

| Subject To Be Printed | File Name | User Information | Digital Watermark |
|---|---|---|---|
| ON | ON | OFF | ON |

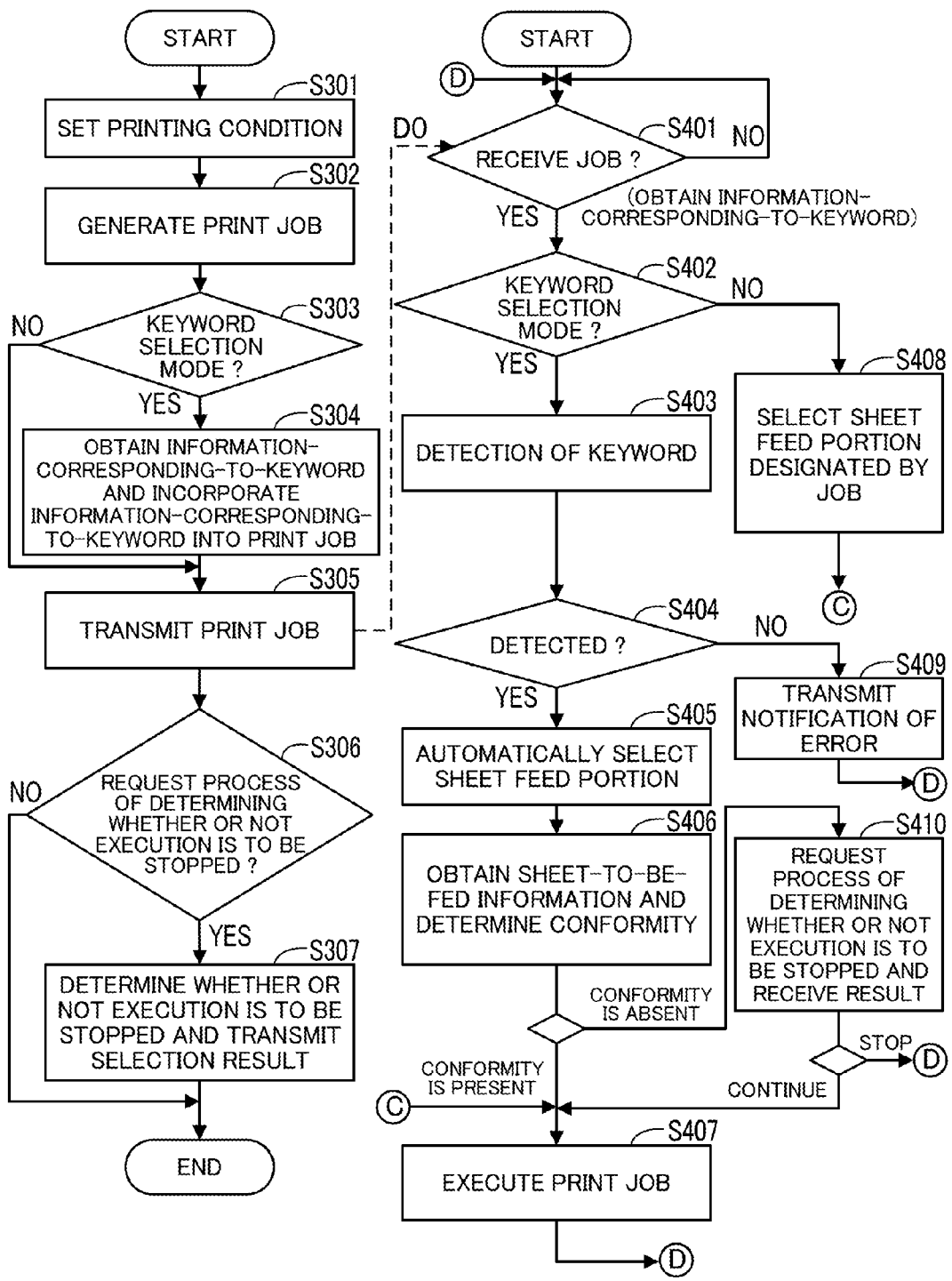

METHOD FOR SELECTING SHEET FEED PORTION FOR IMAGE FORMATION, IMAGE FORMING APPARATUS, AND INFORMATION PROCESSING APPARATUS

INCORPORATION BY REFERENCE

This application is based upon and claims the benefit of priority from the corresponding Japanese Patent Application No. 2015-047931 filed on Mar. 11, 2015, the entire contents of which are incorporated herein by reference.

BACKGROUND

The present disclosure relates to a method for selecting a sheet feed portion for image formation, image forming apparatuses, and information processing apparatuses.

In general, an image forming apparatus having a plurality of sheet feed portions is known. Each of the sheet feed portions feeds a sheet material for image formation to an image forming portion. In general, the sheet material is paper. The sheet feed portion is referred to as a paper sheet feed cassette, a paper sheet cassette, or the like.

An information processing apparatus which serves as a transmitter of a print job allows a user to select a feed source of the sheet material for execution of the print job from among the plurality of sheet feed portions of the image forming apparatus.

Further, it is known that the image forming apparatus automatically selects from among the sheet feed portions according to information, included in the print job, which represents a size of the sheet material for printing. The information, in the print job, representing the size of the sheet material for printing is designated by the user of the information processing apparatus which serves as the transmitter of the print job.

SUMMARY

A method for selecting a sheet feed portion for image formation according to one aspect of the present disclosure includes the following steps. A first step is a step of obtaining, by an image forming apparatus or an information processing apparatus, information-corresponding-to-keyword representing a correspondence relationship between: a keyword; and each of a plurality of the sheet feed portions configured to feed a sheet material for image formation to an image forming portion in the image forming apparatus. The information processing apparatus is configured to transmit a print job to the image forming apparatus. A second step is a step of detecting, by the image forming apparatus or the information processing apparatus, the keyword included in the obtained information-corresponding-to-keyword, from at least two of three data that are subject-to-be-printed data included in the print job, additional text data added to the subject-to-be-printed data, and a digital watermark embedded in the subject-to-be-printed data. A third step is a step of selecting, by the image forming apparatus or the information processing apparatus, the sheet feed portion associated with the keyword detected in the information-corresponding-to-keyword, as a feed source of the sheet material for execution of the print job.

An image forming apparatus according to another aspect of the present disclosure has a plurality of sheet feed portions each of which feeds a sheet material for image formation to an image forming portion, and is configured to execute a print job received from an information processing apparatus. The image forming apparatus includes: an information-corresponding-to-keyword obtaining portion configured to execute the first step; a keyword detection portion configured to execute the second step; and a sheet feed source selection portion configured to execute the third step.

An information processing apparatus according to still another aspect of the present disclosure transmits a print job to an image forming apparatus having a plurality of sheet feed portions. The information processing apparatus includes: an information-corresponding-to-keyword obtaining portion configured to execute the first step; a keyword detection portion configured to execute the second step; and a sheet feed source selection portion configured to execute the third step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 illustrates an example of a data structure of information-corresponding-to-keyword.

FIG. 10 illustrates an example of a data structure of keyword detection range information.

FIG. 11 is a flow chart showing an example of a procedure of selecting a sheet feed portion for image formation according to a second embodiment.

DETAILED DESCRIPTION

Hereinafter, embodiments of the present disclosure will be described with reference to the accompanying drawings. The embodiments described below represent an exemplary implementation of the present disclosure, and the technical scope of the present disclosure is not limited by the embodiments described below.

[Image Forming System]

Firstly, a schematic configuration of an image forming system that includes an image forming apparatus 10 and a terminal device 7 according to the embodiments will be described with reference to FIG. 1.

Figure 1:
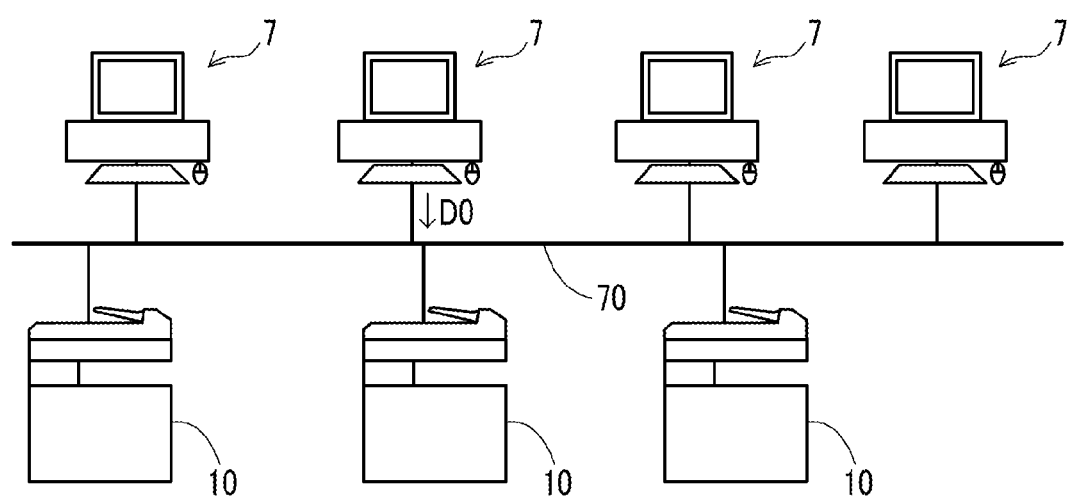
FIG. 1 illustrates a configuration of an image forming system that includes an image forming apparatus and an information processing apparatus according to an embodiment.

As shown in FIG. 1, the image forming system includes the image forming apparatus 10 and the terminal device 7. The terminal device 7 represents an example of an information processing apparatus that transmits a print job D0 to the image forming apparatus 10. The image forming apparatus 10 executes the print job D0 received from the terminal device 7. Executing the print job D0 means forming, on a sheet material 9, an image represented by the print job D0.

The image forming apparatus 10 is communicable with the terminal device 7 via a communication line 70. The communication line 70 is, for example, a LAN (Local Area Network). The communication line 70 may be, for example, a wired LAN, a wireless LAN, or a combination thereof. The terminal device 7 is the information processing apparatus such as a personal computer, a tablet computer, or a smart phone.

The image forming apparatus 10 has a function, as a printer, of receiving, from the terminal device 7, the print job D0 that is a job for image formation, and forming, on the sheet material 9, the image represented by the print job. The sheet material 9 is a sheet-like medium, such as paper, coated paper, postcards, envelopes, and OHP sheets, on which an image is to be formed.

The image forming apparatus 10 of the present embodiment is a multifunction peripheral also having a function of a copying machine and a function of a scanner. Further, the image forming apparatus 10 may have a facsimile communication function.

The image forming apparatus 10 that functions as the copying machine executes a copying job of reading an image of a document 90, and forming the image of the document 90 on the sheet material 9. The copying job is received by the image forming apparatus 10 according to an operation of a user, and is an example of a job concerning image formation.

[Configuration of Image Forming Apparatus 10]

Figure 2:
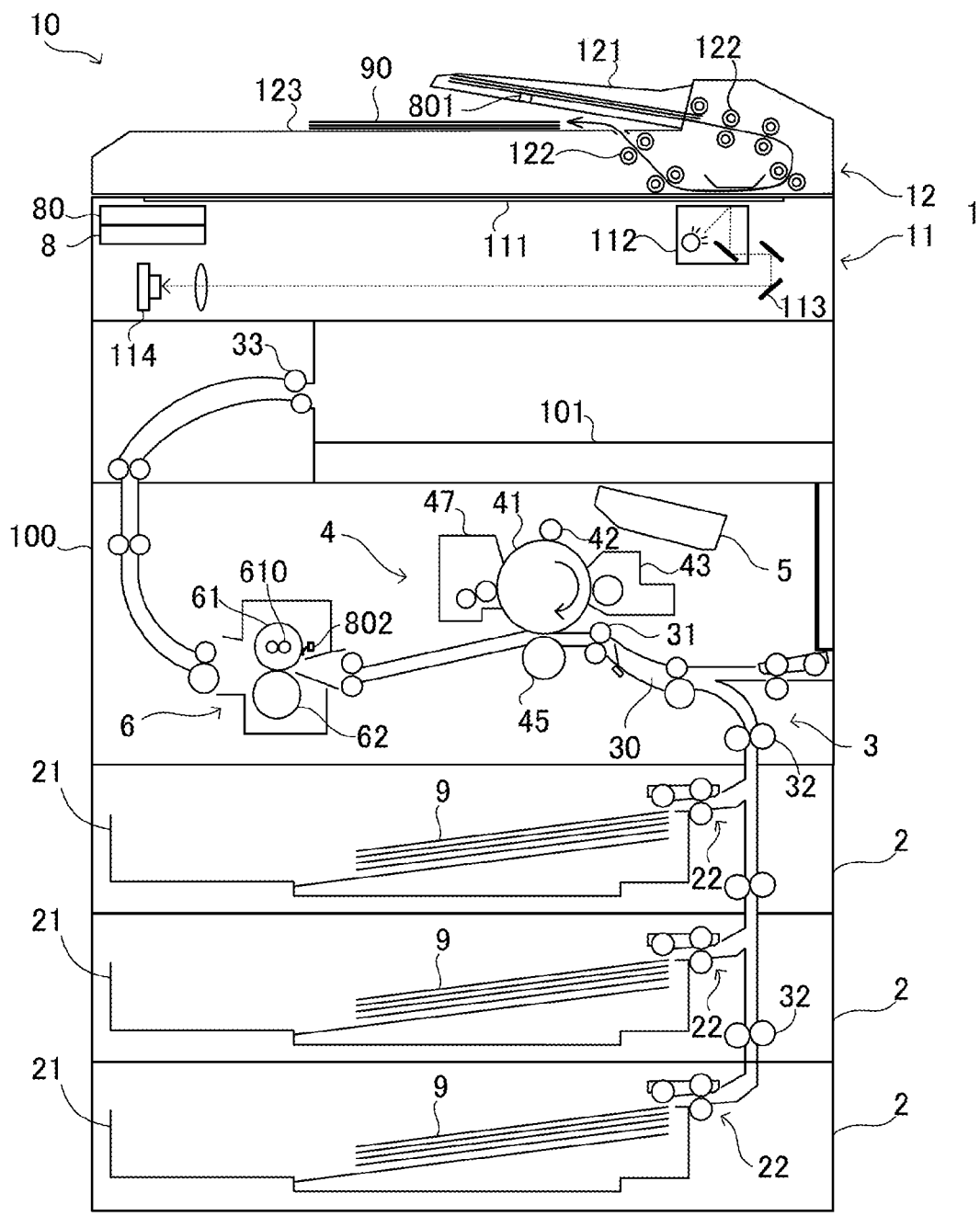
FIG. 2 illustrates a configuration of the image forming apparatus according to the embodiment.

As shown in FIG. 2, the image forming apparatus 10 includes a plurality of sheet feed portions 2, a sheet conveying portion 3, an image forming portion 4, a light scanning portion 5, a fixing portion 6, a control portion 8, an operation display portion 80, and the like. The image forming portion 4, the light scanning portion 5, and the fixing portion 6 execute an image forming process by electrophotography.

Further, the image forming apparatus 10 also includes a document feed reading portion 1. The document feed reading portion 1 includes an image reading portion 11 and an ADF (Auto Document Feeder) 12. The image reading portion 11 includes a document table 111, a reading unit 112, an optical system 113 including a mirror and a lens, an image sensor 114, and the like.

The document table 111 is a portion on which the document 90 is placed, and the document table 111 is provided on the upper surface of the image reading portion 11. The reading unit 112 applies light to the document 90 positioned at a reading position on the document table 111, to reflect the reflected light toward the optical system 113. The reading unit 112 is movable in the sub-scanning direction. The sub-scanning direction represents the right-left direction in FIG. 2.

The optical system 113 guides light reflected by the document 90 toward the image sensor 114. The image sensor 114 includes a photoelectric converter and the like, and outputs an electric signal based on a received amount of light, to the control portion 8, as image data representing an image of the document 90.

The ADF 12 includes a plurality of feed rollers 122 that feed the document 90, and conveys the document 90 set in a document placement portion 121 through the reading position on the document table 111 to a discharge tray 123. A document sensor 801 is a sensor that detects whether or not the document 90 is placed on the document placement portion 121.

Each of the sheet feed portions 2 feeds, toward the image forming portion 4, the sheet material 9 for image formation in the image forming apparatus 10. Each sheet feed portion 2 includes a sheet receiver 21 and a sheet feeder 22. The sheet receiver 21 is configured to stack and place thereon a plurality of the sheet materials 9. The sheet feed portion 2 is referred to as, for example, a paper sheet feed cassette or a paper sheet cassette.

The sheet feeder 22 feeds the sheet materials 9 placed on the sheet receiver 21, one by one, to a conveying path 30 connected to the image forming portion 4. The sheet material 9 is supplied from the sheet feed portion 2 through the sheet conveying portion 3 to the image forming portion 4.

The sheet conveying portion 3 includes a registration roller 31, a feed roller 32, a discharge roller 33, and the like. The registration roller 31 and the feed roller 32 convey the sheet material 9 fed by each sheet feed portion 2 along the conveying path 30 toward the image forming portion 4. Further, the discharge roller 33 discharges the sheet material 9 having an image formed thereon through a discharge outlet of the conveying path 30 onto a discharge tray 101.

The image forming portion 4 forms an image on the surface of the sheet material 9 being moved in the conveying path 30. The image forming portion 4 includes a drum-like photosensitive member 41, a charging portion 42, a developing portion 43, a transfer portion 45, a cleaning portion 47, and the like. The photosensitive member 41 represents an example of an image carrier.

The photosensitive member 41 rotates, and the surface of the photosensitive member 41 is uniformly charged by the charging portion 42. Further, by scanning of laser light by the light scanning portion 5, an electrostatic latent image is written on the surface of the photosensitive member 41 having been charged. Toner is supplied to the photosensitive member 41 by the developing portion 43 to develop the electrostatic latent image into a toner image.

Further, the transfer portion 45 transfers the toner image on the photosensitive member 41 to the sheet material 9 being moved in the conveying path 30. Finally, the cleaning portion 47 removes the toner left on the surface of the photosensitive member 41.

The sheet material 9 having the toner image formed thereon is nipped, by the fixing portion 6, between a fixing roller 61 having a heater 610 incorporated therein, and a pressure roller 62, to feed the sheet material 9 for the following process step. At this time, the heater 610 heats, through the fixing roller 61, an image of the toner formed on the sheet-like sheet material 9. Thus, the toner image (image) on the sheet material 9 can be fixed onto the sheet material 9 by the fixing portion 6. The toner is an example of developer.

The operation display portion 80 includes: an operation portion, for information input, having, for example, a touch panel and an operation button; and a display portion that includes a liquid crystal display panel, a notification lamp, and the like. For example, the operation portion includes a menu display key, a cursor movement key, a start key, and the like.

The menu display key is an operation key through which various setting screens are displayed on the display portion.

The cursor movement key is an operation key through which a cursor on the setting screen displayed on the display portion is moved. The start key is an operation key through which start events for various processes such as a process (scanning process) of reading an image of the document 90 are generated. Further, the touch panel functions as various operation keys such as a text input key.

The control portion 8 causes the operation display portion 80 to display an operation menu, the setting screen, and the like. Further, the control portion 8 controls peripheral devices and electric devices such as a motor, according to: input information that is inputted by an operation performed on the operation display portion 80; and results of detection by various sensors.

[Control Portion 8]

Figure 3:
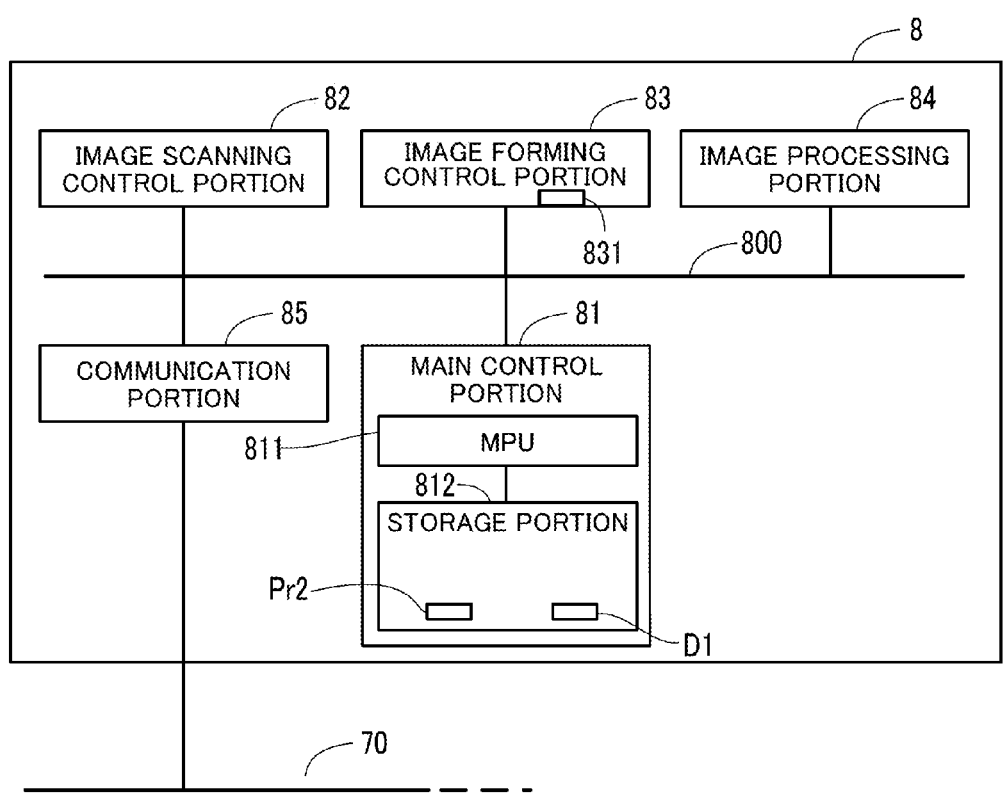
FIG. 3 is a block diagram illustrating a control portion of the image forming apparatus according to the embodiment.

As shown in FIG. 3, the control portion 8 includes a main control portion 81, an image scanning control portion 82, an image forming control portion 83, an image processing portion 84, a communication portion 85, and the like. The main control portion 81 includes an MPU (Micro Processor Unit) 811, a storage portion 812, and the like.

The main control portion 81, the image scanning control portion 82, the image forming control portion 83, the image processing portion 84, and the communication portion 85 are connected to a bus 800. Data can be exchanged among the portions via the bus 800.

The MPU 811 is a processor that executes various calculations and data processing. The storage portion 812 is a computer-readable non-volatile memory in which various information referenced by the MPU 811 is stored. Further, the storage portion 812 is also a memory from which and into which various information can be read and written by the MPU 811.

For example, the storage portion 812 stores, for example, programs which cause the MPU 811 to execute various processes, and information referenced by the MPU 811 that executes the programs.

Figures 7, 8:
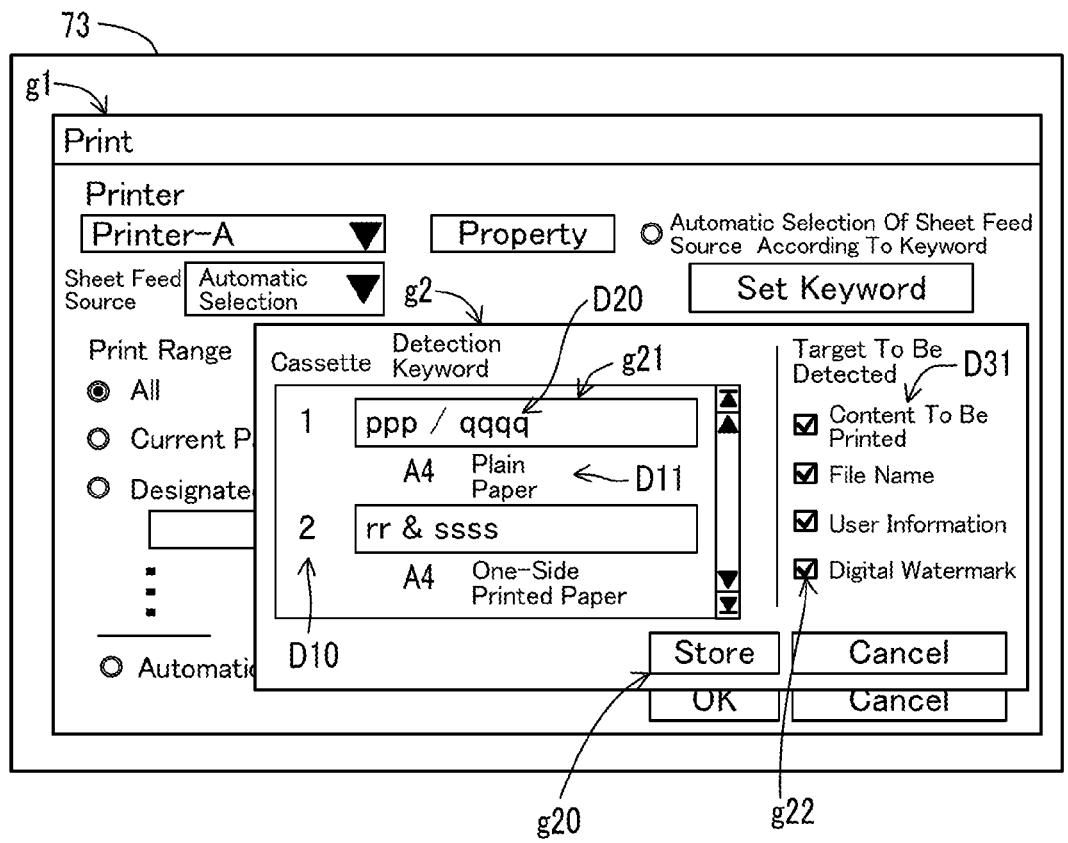
FIG. 7 illustrates an example of an information-corresponding-to-keyword setting screen.
FIG. 8 illustrates an example of a data structure of sheet-to-be-fed information.

For example, the storage portion 812 stores sheet-to-be-fed information D1 as the information referenced by the MPU 811. FIG. 8 illustrates an example of a data structure of the sheet-to-be-fed information D1.

The sheet-to-be-fed information D1 is information that represents a type of the sheet material 9 stored in each sheet feed portion 2. In the example shown in FIG. 8, the sheet-to-be-fed information D1 includes a cassette number D10, sheet type information D11, and priority information D12 which are associated with each other.

The cassette number D10 is information by which each sheet feed portion 2 is identified. The sheet type information D11 includes at least sheet size information D111 representing the size of the sheet material 9. In the example shown in FIG. 8, the sheet size information D111, and orientation information D113 representing an orientation of the sheet material 9 are independently set. The sheet size information D111 may be information representing a combination of the size and the orientation of the sheet material 9.

Further, the sheet type information D11 may include quality information D112 representing the quality of the sheet material 9. The quality information D112 is information by which the material quality of the sheet material 9, such as plain paper, high quality paper, or glossy paper, is identified. Further, the quality information D112 may include information by which a quality for usage, for example, a one-side printed paper sheet, is identified.

The priority information D12 represents priority according to which each sheet feed portion 2 is selected. When a plurality of the sheet feed portions 2 store the sheet materials 9 corresponding to the print job D0, the control portion 8 can select the sheet feed portion 2 for which the priority represented by the priority information D12 is high, as a feed source that feeds a sheet material for printing.

The main control portion 81 comprehensively controls the image forming apparatus 10 by the MPU 811 executing various programs that are previously stored in the storage portion 812. The main control portion 81 also includes a not-illustrated volatile storage portion, such as a RAM, which temporarily stores a program for causing the MPU 811 to execute steps described below.

For example, when receiving the print job D0, the main control portion 81 can select a feed source of the sheet material 9, according to a result of comparison between: the information, included in the print job D0, which represents the size of the sheet material for printing; and the sheet size information D111 of the sheet-to-be-fed information D1

The image scanning control portion 82 controls the document feed reading portion 1 to obtain image data of the document 90 from the image reading portion 11. Further, the image scanning control portion 82 transfers the document image data via the bus 800 to another device such as the image processing portion 84.

The image forming control portion 83 obtains, from the image processing portion 84, image data for recording, and causes the image forming portion 4 and the light scanning portion 5 to execute a process of forming, on the sheet material 9, an image based on the image data for recording.

The image processing portion 84 executes various data processing for, for example, image data obtained from another device via the bus 800. The image processing portion 84 performs the data processing for, for example, the document image data obtained via the image scanning control portion 82 from the image reading portion 11, or the print job D0 obtained via the communication portion 85 from the terminal device 7.

For example, the image processing portion 84 executes a process of converting, to the image data for recording, the document image data obtained from the image scanning control portion 82 and the print job D0 obtained from the communication portion 85, and transferring the image data for recording, to the image forming control portion 83. Further, the image processing portion 84 also has a function of performing image processing such as image rotation processing, halftone processing, or size cutting processing, for the document image data obtained from the image scanning control portion 82.

The communication portion 85 is a communication interface that performs data transmission and reception with an external device such as the terminal device 7 via the communication line 70. Further, the communication portion 85 performs data exchange with another device of the image forming apparatus 10 via the bus 800.

[Terminal Device 7]

Figure 4:
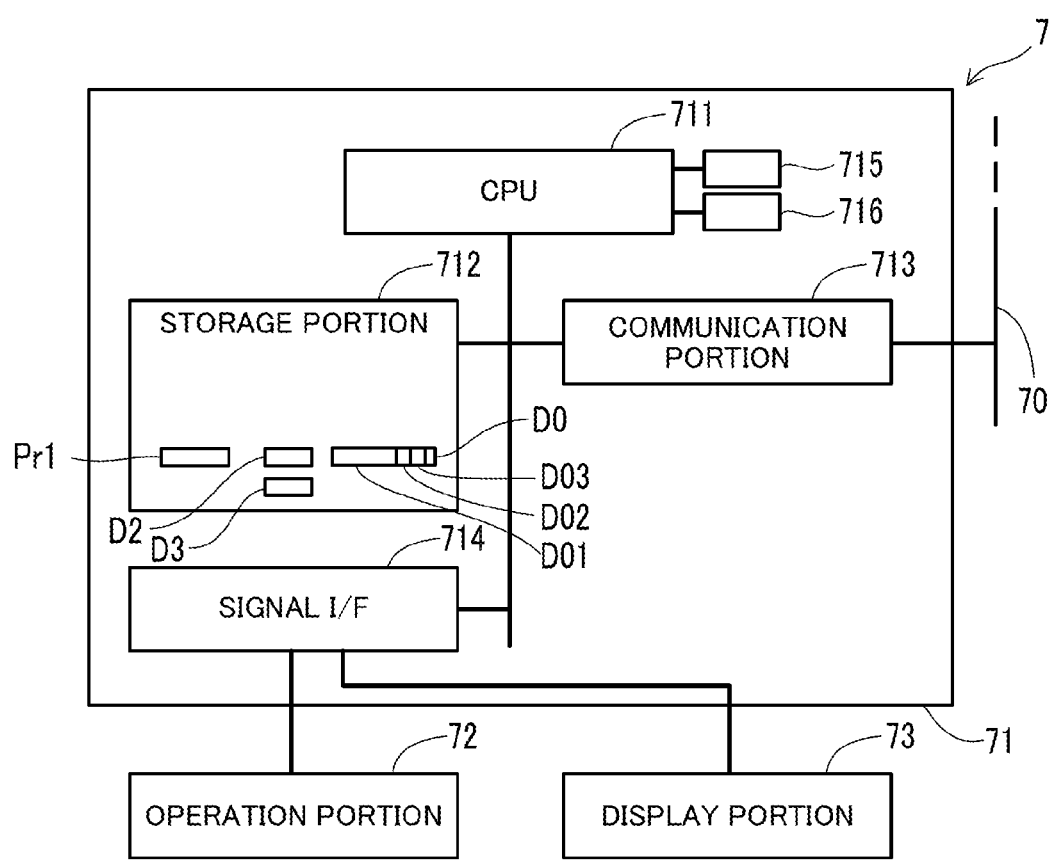
FIG. 4 is a block diagram illustrating the information processing apparatus according to the embodiment.

As shown in FIG. 4, the terminal device 7 includes a main body portion 71, an operation portion 72, and a display portion 73. The main body portion 71 includes a CPU (Central Processing Unit) 711, a storage portion 712, a communication portion 713, a signal interface 714, and the like.

The CPU 711 is a processor that executes various calculations and data processing. The storage portion 712 is a computer-readable non-volatile memory in which various information referenced by the CPU 711 is stored. Further, the storage portion 712 is also a memory from which and into which various information can be read and written by the CPU 711. For example, the storage portion 712 may be a hard disk drive.

The storage portion 712 stores: programs that cause the CPU 711 to execute various processing; and information referenced by the CPU 711 that executes the programs and information written by the CPU 711 that executes the programs. The main body portion 71 includes: a ROM (Read Only Memory) 715 that stores a part of the programs such as a BIOS (Basic Input/Output System); a RAM (Random Access Memory) 716 that temporarily stores the programs executed by the CPU 711; and the like.

The operation portion 72 is an information input device such as a keyboard or a mouse through which information is inputted according to an operation of a person. The display portion 73 is an information output device such as a liquid crystal display. The signal interface 714 relays exchange of information between the CPU 711, and each of the operation portion 72 and the display portion 73.

The communication portion 713 performs data transmission and reception with an external device such as the image forming apparatus 10 via the communication line 70, similarly to the communication portion 85 of the image forming apparatus 10. Further, the communication portion 713 performs data exchange with the CPU 711.

When the terminal device 7 performs a process of transmitting data to or receiving data from the image forming apparatus 10 via the communication line 70, the communication portion 713 relays data communication between the CPU 711 and the image forming apparatus 10.

In general, the terminal device 7 that serves as a transmitter of the print job D0 allows a user to select a feed source of the sheet material 9 for execution of the print job D0, from among the plurality of sheet feed portions 2 of the image forming apparatus 10.

In a company office and the like in which the image forming apparatus 10 is installed, a recommended type of the sheet material for printing is previously defined for each content, such as a request for approval, a proposal, a report, or a confidential document, to be printed, in some cases. In these cases, an operation for designating a type of the sheet material 9 or the sheet feed portion 2 for each print job D0 is bothersome to the user.

Meanwhile, according to the present embodiment, a labor of the user for designating, for example, a type of the sheet material 9 for each print job D0 can be eliminated, and the sheet feed portion 2 of the image forming apparatus 10 used for execution of the print job D0 can be automatically selected. The details thereof will be described below.

[Print Job D0]

The print job D0 includes subject-to-be-printed data D01 and additional text data D02 added to the subject-to-be-printed data D01. That is, the CPU 711 of the terminal device 7 generates the print job D0 that includes the subject-to-be-printed data D01 such as document data and image data, and the previously defined additional text data D02 corresponding to the subject-to-be-printed data D01.

For example, in the terminal device 7, the CPU 711 causes the storage portion 712 to temporarily store the print job D0 having been generated, and further transmits the print job D0 in the storage portion 712 via the communication portion 713 to the image forming apparatus 10.

For example, the additional text data D02 may include one or both of user information and a file name of the subject-to-be-printed data D01. The user information allows identification of the user who has performed an operation for transmitting the print job D0, or an operation for generating the subject-to-be-printed data D01 in the terminal device 7.

Further, the user information may include information representing a name of the user or a department to which the user belongs.

Further, the print job D0 may have a digital watermark D03 embedded in the subject-to-be-printed data D01. In this case, the digital watermark D03 may include information representing properties or contents of the subject-to-be-printed data D01, the user information, or the like. For example, the CPU 711 executes a process of embedding the digital watermark, whereby the digital watermark D03 is embedded in the subject-to-be-printed data D01.

[Information-Corresponding-to-Keyword D2]

In the present embodiment, the storage portion 712 of the terminal device 7 stores information-corresponding-to-keyword D2. The information-corresponding-to-keyword D2 is set for each of the image forming apparatuses 10 with which the terminal device 7 is communicable via the communication line 70. Accordingly, the information-corresponding-to-keyword D2 is stored in the storage portion 712 so as to be associated with user identification information and identification information of the image forming apparatus 10.

That is, the information-corresponding-to-keyword D2 is set for each user identification information. The user identification information is, for example, user account information which is inputted in a user log-in process for the terminal device 7.

FIG. 9 illustrates an example of a data structure of the information-corresponding-to-keyword D2. The information-corresponding-to-keyword D2 represents a correspondence relationship between keywords D20, and the plurality of the sheet feed portions 2, respectively, of the image forming apparatus 10 with which the terminal device 7 is communicable.

In the example shown in FIG. 9, the information-corresponding-to-keyword D2 includes the cassette numbers D10 and the keywords D20 which are associated with each other. The keyword D20 represents an arbitrary character string that is set according to an operation performed by the user on the operation portion 72.

Further, the information-corresponding-to-keyword D2 may include keyword logical operation information D21 representing one or both of a logical disjunction or a logical conjunction of the plurality of the keywords D20 for each cassette number D10. In this case, the keyword D20 is included in the keyword logical operation information D21. As described below, the CPU 711 of the terminal device 7 executes a keyword detection process of detecting the keyword D20 from the print job D0. The keyword detection process will be described below in detail.

[Keyword Detection Range Information D3]

In the present embodiment, the storage portion 712 also stores keyword detection range information D3. The keyword detection range information D3 is set for each of the image forming apparatuses 10 with which the terminal device 7 is communicable via the communication line 70. FIG. 10 illustrates an example of a data structure of the keyword detection range information D3.

The keyword detection range information D3 indicates whether or not a part of the print job D0 is to be excluded from targets to be subjected to the keyword detection process. In the example shown in FIG. 10, the keyword detection range information D3 includes plural sets of category information D31 and enablement/disablement information D32 which are associated with each other.

The category information D31 allows identification of each of plural kinds of information included in the print job D0. The enablement/disablement information D32 indicates whether a part of information, in the print job D0, identified by the category information D31 is enabled information or disabled information.

In the example shown in FIG. 10, the category information D31 is each of: the subject-to-be-printed data D01; information representing the file name in the additional text data D02; the user information in the additional text data D02; and the digital watermark.

Further, the enabled information represents information to be subjected to the keyword detection process. The disabled information represents information which is excluded from the targets to be subjected to the keyword detection process. In FIG. 10, "ON" represents the enabled information and "OFF" represents the disabled information.

First Embodiment

Process of Selecting Sheet Feed Portion for Image Formation

Next, an example of a procedure of the process of selecting a sheet feed portion for image formation, according to the first embodiment, will be described with reference to a flow chart shown in FIG. 5 in which the process of selecting a sheet feed portion for image formation is performed by the terminal device 7 and the image forming apparatus 10.

In the following description, S101, S102, . . . S112 represent identification characters of steps executed by the terminal device 7 in the process of selecting a sheet feed portion for image formation. Steps S101 to S112 are executed by the CPU 711 of the terminal device 7. The CPU 711 executes a printer driver Pr1 that is a program having been installed in the storage portion 712 of the terminal device 7 in advance, to perform the process of steps S101 to S112.

The CPU 711 starts the process from step S101 when a printing operation performed on the operation portion 72 is detected during execution of an application program by which the subject-to-be-printed data D01 is opened.

Further, S201, S202, and S203 represent identification characters of steps executed by the image forming apparatus 10 in the process of selecting a sheet feed portion for image formation. Steps S201 to S203 are executed by the control portion 8 of the image forming apparatus 10.

[Process of Terminal Device 7]

Firstly, a process (S101 to S112) of the terminal device 7 in the process of selecting a sheet feed portion for image formation will be described.

<Step S101>

The terminal device 7 executes a printing condition setting process when the printing operation is detected. The printing condition setting process is a process of setting a printing condition for performing the image forming process for the subject-to-be-printed data D01.

Figure 6:
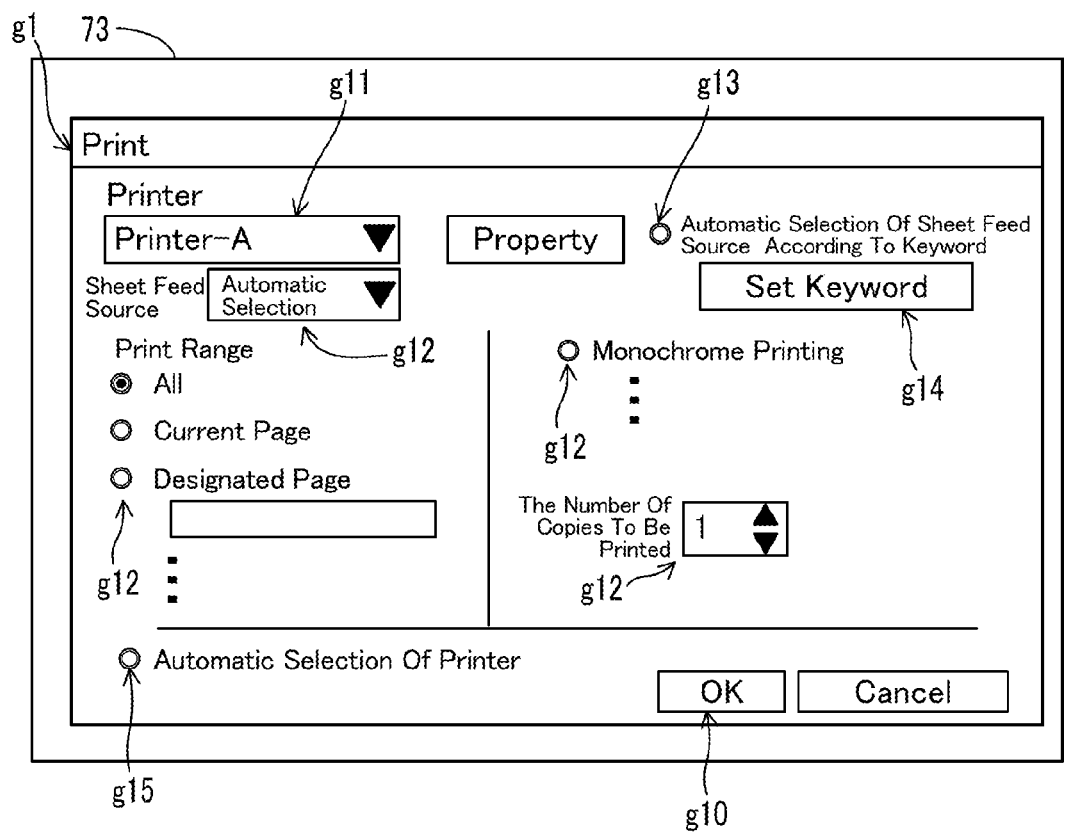
FIG. 6 illustrates an example of a printing condition setting screen.

For example, the CPU 711 of the terminal device 7 displays a printing condition setting screen g1 as shown in FIG. 6 on the display portion 73 in the printing condition setting process. The printing condition setting screen g1 includes an output device selection icon g11, a printing condition setting icon g12, a determination icon g10, and the like.

The CPU 711 selects the image forming apparatus 10 that is caused to execute the print job D0 according to a selection operation performed on the output device selection icon g11. Further, the CPU 711 sets the printing condition according to an operation performed on the printing condition setting icon g12.

For example, setting information of the printing condition includes information for designating, for example, a page to be printed, the number of copies to be printed, and a type of the sheet material 9 for printing. The setting information of the printing condition is incorporated into the print job D0 as a part of the additional text data D02. For example, the information for designating the type of the sheet material 9 includes information for designating one or both of the size and the quality of the sheet material 9.

Further, when an operation performed on the determination icon g10 is detected, the CPU 711 ends the printing condition setting process, and executes step S102 and the following process steps.

In the example shown in FIG. 6, the printing condition setting screen g1 also includes a keyword selection mode designation icon g13 and a keyword setting icon g14.

The keyword selection mode designation icon g13 is an operation icon for designating whether or not a keyword selection mode is to be used. The keyword selection mode is an operation mode for automatically selecting a feed source of the sheet material 9 for execution of the print job D0 with the use of the information-corresponding-to-keyword D2. The details thereof will be described below.

The keyword setting icon g14 is an operation icon through which an event is generated for causing the terminal device 7 to start a process of setting the information-corresponding-to-keyword D2. The CPU 711 executes the keyword setting process when an operation performed on the keyword setting icon g14 is detected.

In the keyword setting process, the information-corresponding-to-keyword D2 is set according to the operation performed on the operation portion 72, and is stored in the storage portion 712. In the keyword setting process, the CPU 711 sets the information-corresponding-to-keyword D2 for the image forming apparatus 10 which is selected according to the operation performed on the output device selection icon g11.

Further, in the example shown in FIG. 6, the printing condition setting screen g1 also includes an output device automatic selection mode designation icon g15. The output device automatic selection mode designation icon g15 is an operation icon for designating whether or not an output device automatic selection mode is to be used.

The output device automatic selection mode is an operation mode for automatically selecting the image forming apparatus 10 that is caused to execute the print job D0 and a feed source of the sheet material 9 for execution of the print job D0 when the keyword selection mode is designated. The output device automatic selection mode can be designated only when the keyword selection mode is designated by the keyword selection mode designation icon g13. The output device automatic selection mode will be described below in detail.

For example, the CPU 711 of the terminal device 7 displays, on the display portion 73, a keyword setting screen g2 as shown in FIG. 7, in the keyword setting process. The keyword setting screen g2 includes: a keyword input box g21 associated with each cassette number D10; and a storage operation icon g20.

In the example shown in FIG. 7, on the keyword setting screen g2, the cassette number D10 and the sheet type information D11 are displayed for each keyword input box g21. The cassette number D10 and the sheet type information D11 are included in the sheet-to-be-fed information D1 that is obtained by the CPU 711 via the communication line 70 from the image forming apparatus 10.

For example, the CPU 711 requests the image forming apparatus 10 to send the sheet-to-be-fed information D1 when, for example, the terminal device 7 is actuated or the process step of step S101 is started, and obtains the sheet-to-be-fed information D1 which is sent back therefrom. As described above, the sheet-to-be-fed information D1 represents a type of the sheet material 9 fed by each of the sheet feed portions 2 in the image forming apparatus 10.

The CPU 711 sets, in the information-corresponding-to-keyword D2, the keyword D20 inputted to the keyword input box g21 according to the operation performed on the operation portion 72. Further, when the operation performed on the storage operation icon g20 is detected, the CPU 711 stores, in the storage portion 712, the information-corresponding-to-keyword D2 which includes the keyword D20 inputted to the keyword input box g21.

In the example shown in FIG. 7, the keyword setting screen g2 also includes an enablement/disablement setting icon g22 that is a check box corresponding to each of the category information D31. The enablement/disablement setting icon g22 is an operation icon for setting the enablement/disablement information D32.

When the operation performed on the storage operation icon g20 is detected, the CPU 711 stores, in the storage portion 712, the keyword detection range information D3 that includes the enablement/disablement information D32 having been set according to the operation performed on the enablement/disablement setting icon g22.

Further, the CPU 711 stores, in the storage portion 712, the information-corresponding-to-keyword D2 and the keyword detection range information D3 so as to be associated with the user identification information. For example, the user identification information is the user account information inputted in the user log-in process for the terminal device 7.

<Step S102>

When the printing condition setting process is ended, the CPU 711 of the terminal device 7 generates the print job D0 including the subject-to-be-printed data D01 and the additional text data D02. In the present embodiment, the additional text data D02 includes: one or both of the file name and the user information; and information of the printing condition having been set in step S101.

For example, the subject-to-be-printed data D01 included in the print job D0 may be data represented by a page description language. In this case, the subject-to-be-printed data D01 representing a document includes information of a character string representing the contents of original document data.

Further, in a case where the digital watermark D03 is embedded, by the CPU 711, in the subject-to-be-printed data D01 during execution of the application program, the generated print job D0 includes the digital watermark D03.

<Step S103>

When generation of the print job D0 is ended, the CPU 711 of the terminal device 7 selects a step to be subsequently performed according to whether or not the keyword selection mode is designated. That is, when the keyword selection mode is designated, the CPU 711 executes step S104 and the following steps as described below. Meanwhile, when the keyword selection mode is not designated, the CPU 711 executes step S109 and the following steps as described below. As described above, the keyword selection mode is designated by the keyword selection mode designation icon g13 on the printing condition setting screen g1 shown in FIG. 6.

<Step S104>

When the keyword selection mode is designated, the CPU 711 of the terminal device 7 obtains, from the storage portion 712, the information-corresponding-to-keyword D2 and the keyword detection range information D3. At this time, the CPU 711 obtains the information-corresponding-to-keyword D2 and the keyword detection range information D3 which correspond to the user identification information having been inputted in the user log-in process in which the user has succeeded before step S101. The user identification information inputted in the user log-in process is an example of the user identification information representing a transmitter of the print job D0.

When the output device automatic selection mode is not designated in step S101, the CPU 711 obtains the information-corresponding-to-keyword D2 and the keyword detection range information D3 for the image forming apparatus 10 selected by the output device selection icon g11 on the printing condition setting screen g1 shown in FIG. 6.

Meanwhile, when the output device automatic selection mode is designated in step S101, the CPU 711 obtains the information-corresponding-to-keyword D2 and the keyword detection range information D3 for all the image forming apparatuses 10 stored in the storage portion 712. Thus, the information-corresponding-to-keyword D2 and the keyword detection range information D3 are obtained, by the CPU 711, for each of a plurality of the image forming apparatuses 10 with which the terminal device 7 is communicable via one communication line 70.

<Step S105>

Next, the CPU 711 executes the keyword detection process. In the keyword detection process, the CPU 711 detects the keyword D20 included in the information-corresponding-to-keyword D2 obtained in step S104, from the subject-to-be-printed data D01 and the additional text data D02 that are included in the print job D0.

Further, when the digital watermark D03 is embedded in the subject-to-be-printed data D01, the CPU 711 detects the keyword D20 also from the digital watermark D03.

For example, when the subject-to-be-printed data D01 is document data, the CPU 711 detects the keyword D20 from the document data.

Further, the subject-to-be-printed data D01 may be image data or the subject-to-be-printed data D01 may include image data. In this case, the CPU 711 may execute a well-known OCR (Optical Character Recognition) process, to recognize a character string from the image data, and detect the keyword D20 from the character string.

However, the CPU 711 detects the keyword D20 only in the information designated as the enabled information by the enablement/disablement information D32 of the keyword detection range information D3 among the information included in the subject-to-be-printed data D01, the additional text data D02, and the digital watermark D03.

Further, in step S101, the output device automatic selection mode may be designated. In this case, the CPU 711 detects the keyword D20 included in a plurality of the information-corresponding-to-keyword D2 which correspond to a plurality of the image forming apparatuses 10, from the subject-to-be-printed data D01 and the additional text data D02 that are included in the print job D0 (S105).

<Step S106>

Further, the CPU 711 determines whether or not the target keyword D20 has been detected from the print job D0.

The information-corresponding-to-keyword D2 obtained in step S104 may include the keyword logical operation information D21. In this case, the CPU 711 determines whether or not the keyword D20 is included in the print job D0 so as to satisfy the logical condition of the keyword logical operation information D21 in the keyword detection process.

Only when the CPU 711 determines that the keyword D20 is included in the print job D0 so as to satisfy the logical condition of the keyword logical operation information D21, the CPU 711 determines that the target keyword D20 has been detected from the print job D0.

<Step S107>

When the target keyword D20 has been detected from the print job D0, the CPU 711 executes a sheet feed portion automatic selection process. In the sheet feed portion automatic selection process, the sheet feed portion 2 associated, in the information-corresponding-to-keyword D2, with the keyword D20 detected in step S105 is selected as a feed source of the sheet material 9 for execution of the print job D0.

More specifically, in the sheet feed portion automatic selection process, the CPU 711 selects the cassette number D10 corresponding to the keyword D20 detected from the print job D0 in step S105 as the identification information of the feed source of the sheet material 9 with reference to the information-corresponding-to-keyword D2.

Further, in step S101, the output device automatic selection mode may be designated. In this case, the CPU 711 executes the sheet feed portion automatic selection process for each of the plurality of the information-corresponding-to-keyword D2 corresponding to the plurality of the image forming apparatuses 10. In this case, the CPU 711 selects the sheet feed portion 2 of the image forming apparatus 10 which is associated with the keyword D20 detected in step S105, as a feed source of the sheet material 9 for execution of the print job D0. That is, when the output device automatic selection mode is designated, the image forming apparatus 10 that executes the print job D0 is automatically selected, and the feed source of the sheet material 9 for execution of the print job D0 is automatically selected.

The number of the sheet feed portions 2 associated, in the information-corresponding-to-keyword D2, with the keyword D20 detected in the step S105, may be plural. In this case, the CPU 711 may select one of the plurality of the sheet feed portions 2 that are candidates to be selected, according to a predefined priority rule, as the feed source of the sheet material 9 for execution of the print job D0.

For example, the priorities for the plurality of the sheet feed portions 2 may be preset for each image forming apparatus 10. The priority information D12 included in the sheet-to-be-fed information D1 is an example of information representing the priority. In this case, the priority rule includes a rule according to which one sheet feed portion 2 having the highest priority is selected from among a plurality of candidates to be selected, as the feed source of the sheet material 9.

Further, in each terminal device 7, priorities for the image forming apparatuses 10 with which the terminal device 7 is communicable, may be preset. The priority is information set for a case where the keyword D20 is detected in a plurality of the information-corresponding-to-keyword D2 which correspond to the different image forming apparatuses 10. In this case, the priority rule includes a rule according to which the sheet feed portion 2 of one image forming apparatus 10 having the highest priority is selected from among a plurality of candidates to be selected, as the feed source of the sheet material 9.

Further, the CPU 711 may present a plurality of candidates to be selected by means of the display portion 73, and select one of the sheet feed portions 2 according to a selection operation performed by the user on the operation portion 72.

<Step S108>

Further, the CPU 711 of the terminal device 7 executes a conformity determination process for the sheet type information D11. In the conformity determination process, it is determined whether conformity is present or absent between: the sheet type information D11 associated, in the sheet-to-be-fed information D1 obtained in step S101, with the sheet feed portion 2 selected as the feed source of the sheet material 9; and the information, included in the print job D0, for designating the type of the sheet material 9. The information for designating the type of the sheet material 9 is a part of the information of the printing condition having been set in step S101.

For example, when the sheet size information D111 or the quality information D112 associated, in the sheet-to-be-fed information D1, with the cassette number D10 selected as the feed source of the sheet material 9 does not conform to the information representing the size or the quality of the sheet material 9 which has been set as the printing condition in step S101, the CPU 711 determines that the conformity is absent.

<Step S109>

When the CPU 711 determines that the conformity is present in the conformity determination process, the information for designating the sheet feed portion 2 selected in step S107 as the feed source of the sheet material 9 is incorporated into the print job D0 generated in step S102, and the print job D0 is transmitted to the image forming apparatus 10. For example, the information for designating the feed source of the sheet material 9 is incorporated into the additional text data D02 as a part of the setting information of the printing condition.

When the output device automatic selection mode is not designated in step S101, the CPU 711 transmits the print job D0 to the image forming apparatus 10 selected by the output device selection icon g11 on the printing condition setting screen g1 shown in FIG. 6.

Meanwhile, when the output device automatic selection mode is designated in step S101, the CPU 711 transmits the print job D0 to the image forming apparatus 10 selected in step S107.

<Step S110>

After transmission of the print job D0, the CPU 711 executes a transmission result notification process. When the output device automatic selection mode is designated in step S101, the transmission result notification process includes a process of making notification of a destination to which the print job D0 is transmitted, by means of the display portion 73.

Further, in a case where transmission of the print job D0 has failed due to some cause, the transmission result notification process includes a process of making notification that transmission of the print job D0 has failed.

After step S110, the CPU 711 ends the processes for selection of the sheet feed portion 2 and transmission of the print job D0.

<Step S111>

When the target keyword D20 is not detected from the print job D0 in step S106, the CPU 711 executes a process of making notification of an error message by means of the display portion 73. Thereafter, the CPU 711 restarts the process from step S101.

<Step S112>

When the determination result in step S108 indicates that the conformity is absent in the conformity determination process, the CPU 711 executes a process of determining whether or not execution is to be stopped. In the process of determining whether or not execution is to be stopped, whether or not execution of the print job D0 by using the sheet feed portion 2 having been already selected in step S107 as the feed source of the sheet material 9 is to be stopped, is determined according to a selection operation performed on the operation portion 72.

Further, the process of determining whether or not execution is to be stopped includes a process of outputting a warning message by means of the display portion 73. The warning message indicates that the sheet type information D11 associated with the sheet feed portion 2 selected as the feed source of the sheet material 9 does not conform to the information, included in the print job D0, for designating the type of the sheet material 9.

When the execution of the print job D0 is selected in the process of determining whether or not execution is to be stopped, the CPU 711 executes the process steps of steps S109 and S110. Thereafter, the CPU 711 ends the processes for the selection of the sheet feed portion 2 and the transmission of the print job D0.

Meanwhile, when stop of the print job D0 is selected in the process of determining whether or not execution is to be stopped, the CPU 711 does not transmit the print job D0 and ends the processes for the selection of the sheet feed portion 2 and the transmission of the print job D0.

[Process of Image Forming Apparatus 10]

Next, a process (S201 to S203) of the image forming apparatus 10 in the process of selecting a sheet feed portion for image formation will be described.

For example, when the image forming apparatus 10 is actuated, the main control portion 81 starts the process from step S201. The main control portion 81 executes the process of step S201 to S203 by the MPU 811 executing a main control program Pr2 that is previously stored in the storage portion 812.

<Step S201>

The main control portion 81 performs monitoring to determine whether or not the print job D0 is received via the communication line 70 from the terminal device 7.

<Step S202>

When the print job D0 is received, the main control portion 81 selects the feed source of the sheet material 9 for execution of the print job D0 according to information, included in the print job D0, for designating the sheet feed portion 2.

That is, when the keyword selection mode is designated by the terminal device 7, the sheet feed portion 2 that has been automatically selected according to a result of detection in the keyword detection process by the terminal device 7 is selected as the feed source of the sheet material 9 by the image forming apparatus 10.

Further, when the keyword selection mode is not designated by the terminal device 7, the sheet feed portion 2 designated by the user in the printing condition setting process in the terminal device 7 is selected as the feed source of the sheet material 9 by the image forming apparatus 10.

The information for designating the sheet feed portion 2 may not be included in the print job D0. In this case, information indicating that the feed source of the sheet material 9 is to be automatically selected by the image forming apparatus 10 is set in the printing condition setting process. In this case, the main control portion 81 selects, as the feed source of the sheet material 9, the sheet feed portion 2 corresponding to the size designation information, included in the print job D0, for the sheet material 9.

<Step S203>

Further, the main control portion 81 causes the image forming control portion 83 to execute the print job D0 by using the sheet feed portion 2 selected in step S202 as the feed source of the sheet material 9. After step S203, the main control portion 81 restarts the process from step S201.

In the process of selecting a sheet feed portion for image formation as described above, when a specific keyword D20 is included in the print job D0, the sheet feed portion 2 that is associated with the keyword D20 in advance is automatically selected as a feed source of the sheet material 9 for execution of the print job D0.

Therefore, in a company office and the like in which the image forming apparatus 10 is installed, in a case where a recommended type of the sheet material 9 for printing is previously defined for each content to be printed, an appropriate sheet feed portion 2 can be automatically selected without requiring a labor of the user for designating a type of the sheet material 9 or the sheet feed portion 2 for each print job D0.

For example, in a company office and the like in which the image forming apparatus 10 is installed, a recommended type of the sheet material 9 for printing is previously defined for each content, such as a request for approval, a proposal, a report, or a confidential document, to be printed, in some cases. In these cases, the keyword D20 included in the information-corresponding-to-keyword D2 may be a word representing approval, proposal, report, confidential, or the like.

Further, the information-corresponding-to-keyword D2 is set for each user identification information. Therefore, automatic selection of the sheet feed portion 2 can be executed according to each user's request.

Further, by setting the keyword detection range information D3 in step S101, whether or not the keyword D20 is to be detected by excluding a part of the print job D0 from the targets to be subjected to the detection, can be determined. Thus, the process of automatically selecting the sheet feed portion 2 can be flexibly adapted for usage environment.

Further, the conformity determination process (S108) and the process of determining whether or not execution is to be stopped (S109) are performed. Therefore, conformity of a result of the process of automatically selecting the sheet feed portion 2 to the user' intention can be assured with an enhanced accuracy.

Further, in the present embodiment, the terminal device 7 obtains the information-corresponding-to-keyword D2 for each of the plurality of the image forming apparatus 10 with which the terminal device 7 is communicable (S104), and the image forming apparatus 10 and the sheet feed portion 2 thereof, which are associated with the keyword D20 detected in the keyword detection process, can be selected. Thus, the user's labor for designating the image forming apparatus 10 for each print job D0 can be eliminated.

Second Embodiment

Process of Selecting Sheet Feed Portion for Image Formation

Next, an example of a procedure of the process of selecting a sheet feed portion for image formation, according to a second embodiment, will be described with reference to a flow chart shown in FIG. 11 in which the process of selecting a sheet feed portion for image formation is performed by the terminal device 7 and the image forming apparatus 10.

In the following description, S301, S302, . . . S307 represent identification characters of steps executed by the terminal device 7 in the process of selecting a sheet feed portion for image formation. Steps S301 to S307 are executed by the CPU 711 of the terminal device 7. The CPU 711 executes the printer driver Pr1 to execute the process of steps S301 to S307.

The CPU 711 starts the process from step S301 when a printing operation performed on the operation portion 72 is detected during execution of an application program by which the subject-to-be-printed data D01 is opened.

Further, S401, S402, . . . S410 represent identification characters of steps executed by the image forming apparatus 10 in the process of selecting a sheet feed portion for image formation. Steps S401 to S410 are executed by the control portion 8 of the image forming apparatus 10.

[Process of Terminal Device 7]

Firstly, a process (S301 to S307) of the terminal device 7 in the process of selecting a sheet feed portion for image formation will be described.

<Step S301>

Figure 5:
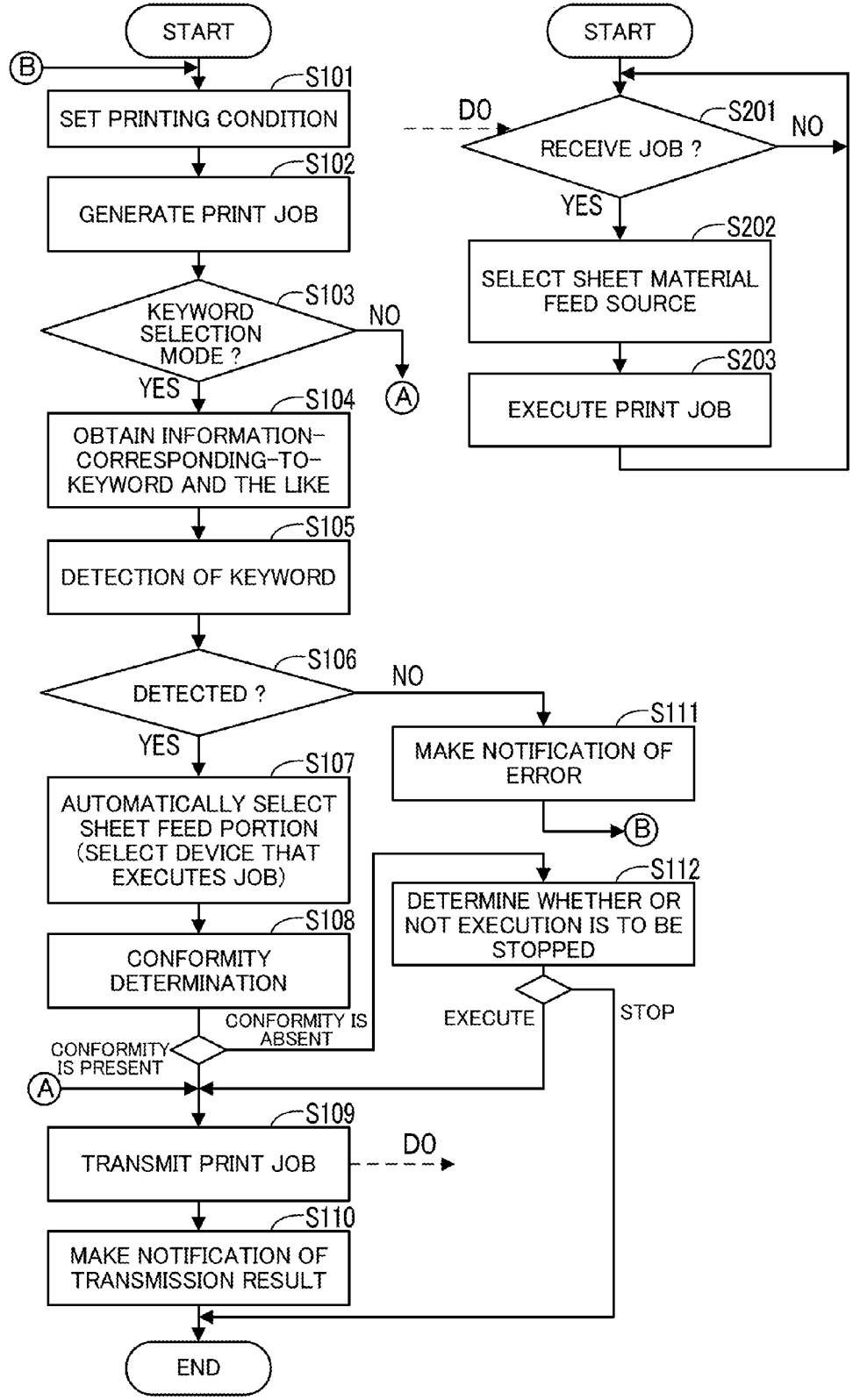
FIG. 5 is a flow chart showing an example of a procedure of selecting a sheet feed portion for image formation according to a first embodiment.

The terminal device 7 executes a printing condition setting process when the printing operation is detected, as in step S101 shown in FIG. 5.

<Step S302>

When the printing condition setting process is ended, the CPU 711 of the terminal device 7 generates the print job D0 including the subject-to-be-printed data D01 and the additional text data D02, as in step S102 shown in FIG. 5. For example, in step S302, information indicating whether or not the keyword selection mode is designated may be incorporated into the print job D0.

<Step S303>

When generation of the print job D0 is ended, the CPU 711 of the terminal device 7 determines whether the process step of the following step S304 is to be executed or skipped, according to whether or not the keyword selection mode is designated.

<Step S304>

When the keyword selection mode is designated, the CPU 711 obtains, from the storage portion 712, the information-corresponding-to-keyword D2 and the keyword detection range information D3, and incorporates, into the print job D0, the information-corresponding-to-keyword D2 and the keyword detection range information D3. At this time, the CPU 711 incorporates, into the print job D0, the information-corresponding-to-keyword D2 and the keyword detection range information D3 which correspond to the user identification information having been inputted in the user log-in process in which the user has succeeded before step S301.

In step S304, the CPU 711 incorporates, into the print job D0, the information-corresponding-to-keyword D2 and the keyword detection range information D3 associated with the image forming apparatus 10 selected by the output device selection icon g11 on the printing condition setting screen g1 shown in FIG. 6.

In step S304, the information-corresponding-to-keyword D2 which is included in the print job D0 may double as information indicating whether or not the keyword selection mode is designated.

In the present embodiment, the terminal device 7 does not have a function of designating the output device automatic selection mode. That is, the image forming apparatus 10 that executes the print job D0 is designated by the user.

<Step S305>

Next, the CPU 711 transmits the print job D0 to the image forming apparatus 10. At this time, the CPU 711 transmits the print job D0 to the image forming apparatus 10 selected by the output device selection icon g11 on the printing condition setting screen g1 shown in FIG. 6.

<Step S306>

Next, the CPU 711 performs monitoring to determine whether or not a command for requesting the process of determining whether or not execution is to be stopped is received from the destination to which the print job D0 has been transmitted. When the command for requesting the process of determining whether or not execution is to be stopped is not received within a predetermined time period, the CPU 711 ends the process for the transmission of the print job D0. The process of determining whether or not execution is to be stopped is a process of step S112 shown in FIG. 5.

<Step S307>

Meanwhile, when the command for requesting the process of determining whether or not execution is to be stopped is received from the destination to which the print job D0 has been transmitted, the CPU 711 executes the process of determining whether or not execution is to be stopped, as in step S112 shown in FIG. 5. Further, the CPU 711 transmits, to the destination to which the print job D0 has been transmitted, a selection result in the process of determining whether or not execution is to be stopped. Thereafter, the CPU 711 ends the process for the transmission of the print job D0.

[Process of Image Forming Apparatus 10]

Next, a process (S401 to S410) of the image forming apparatus 10 in the process of selecting a sheet feed portion for image formation will be described.

For example, when the image forming apparatus 10 is actuated, the main control portion 81 starts the process from step S401. The main control portion 81 executes the process of steps S401 to S410 by the MPU 811 executing the main control program Pr2 that is previously stored in the storage portion 812.

<Step S401>

The main control portion 81 performs monitoring to determine whether or not the print job D0 is received via the communication line 70 from the terminal device 7, as in step S201 shown in FIG. 5.

When the keyword selection mode is designated in step S301, the print job D0 includes the information-corresponding-to-keyword D2 and the keyword detection range information D3. In this case, the main control portion 81 that execute the process step of step S401 is an example of an information-corresponding-to-keyword obtaining portion that executes a step of obtaining the information-corresponding-to-keyword D2.

<Step S402>

Next, the main control portion 81 determines whether or not the keyword selection mode is designated, according to the information included in the print job D0. For example, the main control portion 81 determines whether or not the keyword selection mode is designated, according to whether or not the information-corresponding-to-keyword D2 is included in the print job D0.

<Step S403>

When the keyword selection mode is designated, the main control portion 81 executes the keyword detection process as in step S105 shown in FIG. 5. In the keyword detection process, the main control portion 81 detects the keyword D20 included in the information-corresponding-to-keyword D2 which has been obtained in step S401, from two or more of the subject-to-be-printed data D01, the additional text data D02, and the digital watermark D03 which are included in the print job D0.

In the keyword detection process, the keyword D20 is detected in the subject-to-be-printed data D01 which has not been converted to raster data, for example, the subject-to-be-printed data D01 represented by the page description language.

However, the CPU 711 detects the keyword D20 only in the information designated as the enabled information by the enablement/disablement information D32 of the keyword detection range information D3 among the information included in the subject-to-be-printed data D01, the additional text data D02, and the digital watermark D03.

<Step S404>

Further, the main control portion 81 determines whether or not the target keyword D20 has been detected from the print job D0, as in step S106 shown in FIG. 5.

<Step S405>

When the target keyword D20 has been detected from the print job D0, the main control portion 81 executes the sheet feed portion automatic selection process, as in step S107 shown in FIG. 5.

<Step S406>

Further, the main control portion 81 of the image forming apparatus 10 obtains the sheet-to-be-fed information D1 from the storage portion 812, and executes the conformity determination process for the sheet type information D11 as in step S108 shown in FIG. 5. Thus, it is determined whether conformity is present or absent between: the sheet type information D11 associated, in the sheet-to-be-fed information D1 in the storage portion 812, with the sheet feed portion 2 selected as the feed source of the sheet material 9; and the information, included in the print job D0, for designating the type of the sheet material 9.

<Step S407>

When the main control portion 81 determines that the conformity is present in the conformity determination process, the main control portion 81 causes the image forming control portion 83 to execute the print job D0 by using, as the feed source of the sheet material 9, the sheet feed portion 2 selected in step S405 or step S408 described below. After step S407, the main control portion 81 restarts the process from step S401.

<Step S408>

Meanwhile, when the keyword selection mode is not designated, the main control portion 81 selects, as the feed source of the sheet material 9 for execution of the print job D0, the sheet feed portion 2 designated by the information of the printing condition in the print job D0. After step S408, the main control portion 81 executes the process step of step S407 described above.

Information for designating the sheet feed portion 2 may not be included in the print job D0. In this case, the main control portion 81 selects, as the feed source of the sheet material 9, the sheet feed portion 2 corresponding to the size designation information, included in the print job D0, for the sheet material 9.

<Step S409>

When the target keyword D20 is not detected from the print job D0 in step S404, the main control portion 81 executes a process of transmitting an error message to the transmitter of the print job D0. Thereafter, the main control portion 81 restarts the process from step S401. The terminal device 7 that has received the error message displays the error message on the display portion 73.

<Step S410>

In a case where the determination result in the conformity determination process of step S406 indicates that the conformity is absent, the main control portion 81 transmits, to the transmitter of the print job D0, a command for requesting the process of determining whether or not execution is to be stopped. Further, the main control portion 81 receives, from the transmitter of the print job D0, the selection result in the process of determining whether or not execution is to be stopped.

When execution of the print job D0 is selected in the process of determining whether or not execution is to be stopped, the main control portion 81 executes the process step of step S407. In this case, a result of selection of the sheet feed portion 2 in step S405 is adopted.

Meanwhile, when stop of the print job D0 is selected in the process of determining whether or not execution is to be stopped, the main control portion 81 does not cause the image forming control portion 83 to execute the print job D0, and restarts the process from step S401.

Also when the second embodiment described above is implemented, the same effect as in a case where the first embodiment described above is implemented, can be obtained.

Step S104 (FIG. 5) executed by the terminal device 7 that is an example of the information processing apparatus, and step S401 (FIG. 11) executed by the image forming apparatus 10 are each an example of a step of obtaining the information-corresponding-to-keyword D2 representing a correspondence relationship between: the keyword D10; and each of the plurality of the sheet feed portions 2. Further, the CPU 711 that executes the process step of step S104 and the main control portion 81 that executes the process step of step S401 are each an example of the information-corresponding-to-keyword obtaining portion.

Further, step S105 (FIG. 5) executed by the terminal device 7 and step S403 (FIG. 11) executed by the image forming apparatus 10 are each an example of a step of detecting the keyword D20 included in the obtained information-corresponding-to-keyword D2, from at least two of three data that are the subject-to-be-printed data D01, the additional text data D02, and the digital watermark D03 which are included in the print job D0. Further, the CPU 711 that executes the process step of step S105 and the main control portion 81 that executes the process step of step S403 are each an example of the keyword detection portion.

Further, step S107 (FIG. 5) executed by the terminal device 7 and step S405 (FIG. 11) executed by the image forming apparatus 10 are each an example of a step of selecting, as the feed source of the sheet material 9 for execution of the print job D0, the sheet feed portion 2 associated with the keyword D20 detected in the information-corresponding-to-keyword D2. Further, the CPU 711 that executes the process step of step S107 and the main control portion 81 that executes the process step of step S405 are each an example of the sheet feed source selection portion.

Further, step S101 (FIG. 5) of setting, by the terminal device 7, the keyword detection range information D3 as a part of the printing condition is an example of a step of presetting a part of the print job D0 to be excluded from the targets to be subjected to the detection, in the step of detecting the keyword D20.

Further, the printer driver Pr1 that causes the CPU 711 of the terminal device 7 to execute each step in the process of selecting a sheet feed portion for image formation, and the main control program Pr2 that causes the MPU 811 of the image forming apparatus 10 to execute each step in the process of selecting a sheet feed portion for image formation are each an example of a program for selecting a sheet feed portion for image formation.

Application Example

In each embodiment described above, the conformity determination process and the processes associated therewith (S108, S112 in FIG. 5, S406, S410 in FIG. 11) may be omitted.

Further, in each embodiment, the information-corresponding-to-keyword D2 and the keyword detection range information D3 may be stored in the storage portion 812 of the image forming apparatus 10 or a storage portion of a server device that is communicable with the terminal device 7 or the image forming apparatus 10 via the communication line 70.

Further, in each embodiment, the keyword detection range information D3 may be set for each sheet feed portion 2 of the image forming apparatus 10. In this case, in the keyword detection process, the keyword D20 is detected only in the information designated as the enabled information in the keyword detection range information D3 set for each sheet feed portion 2, among the information included in the print job D0.

The method for selecting a sheet feed portion for image formation, the image forming apparatus, the information processing apparatus, and the program for selecting a sheet feed portion for image formation according to the present disclosure, can be implemented by optionally combining the embodiments and/or the application examples as described above, or by modifying or partially omitting the embodiments and/or the application examples as appropriate within the scope of the disclosure defined by claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A method for selecting a sheet feed portion for image formation, the method comprising the steps of:
   obtaining, by an image forming apparatus, or an information processing apparatus configured to transmit a print job to the image forming apparatus, information-corresponding-to-keyword representing a correspondence relationship between: a keyword; and each of a plurality of the sheet feed portions configured to feed a sheet material for image formation to an image forming portion in the image forming apparatus;
   detecting, by the image forming apparatus or the information processing apparatus, the keyword included in the obtained information-corresponding-to-keyword, from at least two of three data that are subject-to-be-printed data included in the print job, additional text data added to the subject-to-be-printed data, and a digital watermark embedded in the subject-to-be-printed data; and
   selecting, by the image forming apparatus or the information processing apparatus, the sheet feed portion associated with the keyword detected in the information-corresponding-to-keyword, as a feed source of the sheet material for execution of the print job.

2. The method for selecting a sheet feed portion for image formation according to claim 1, wherein
   the information-corresponding-to-keyword is set for each user identification information, and
   the step of obtaining the information-corresponding-to-keyword is a step of obtaining the information-corresponding-to-keyword which corresponds to the user identification information representing a transmitter of the print job.

3. The method for selecting a sheet feed portion for image formation according to claim 1, further comprising presetting a part of the print job to be excluded from targets to be subjected to detection, in the step of detecting the keyword.

4. The method for selecting a sheet feed portion for image formation according to claim 1, further comprising the steps of:
   obtaining, by the image forming apparatus or the information processing apparatus, sheet-to-be-fed information representing a type of the sheet material to be fed by each sheet feed portion;
   determining, by the image forming apparatus or the information processing apparatus, whether conformity is present or absent between: information representing the type of the sheet material associated, in the sheet-to-be-fed information, with the sheet feed portion selected as the feed source of the sheet material; and information, included in the print job, for designating the type of the sheet material; and
   determining, by the information processing apparatus, whether or not execution of the print job by using the sheet feed portion having been already selected as the feed source of the sheet material, is to be stopped, according to a selection operation performed on an operation portion, when the conformity is determined as being absent.

5. The method for selecting a sheet feed portion for image formation according to claim 1, wherein
   in the step of obtaining the information-corresponding-to-keyword, the information-corresponding-to-keyword is obtained for each of a plurality of the image forming apparatuses with which the information processing apparatus is communicable via one communication line, and
   the information processing apparatus selects the sheet feed portion of the image forming apparatus associated with the detected keyword.

6. An image forming apparatus having a plurality of sheet feed portions each of which feeds a sheet material for image formation to an image forming portion, and configured to execute a print job received from an information processing apparatus, the image forming apparatus comprising:
   an information-corresponding-to-keyword obtaining portion configured to obtain information-corresponding-to-keyword representing a correspondence relationship between a keyword, and each of the sheet feed portions;
   a keyword detection portion configured to detect the keyword included in the obtained information-corresponding-to-keyword, from at least two of three data that are subject-to-be-printed data included in the print job, additional text data added to the subject-to-be-printed data, and a digital watermark embedded in the subject-to-be-printed data; and a sheet feed source selection portion configured to select the sheet feed portion associated with the keyword detected in the information-corresponding-to-keyword, as a feed source of the sheet material for execution of the print job.

7. An information processing apparatus that transmits a print job to an image forming apparatus having a plurality of sheet feed portions each of which feeds a sheet material for image formation to an image forming portion, the information processing apparatus comprising:

an information-corresponding-to-keyword obtaining portion configured to obtain information-corresponding-to-keyword representing a correspondence relationship between a keyword, and each of the sheet feed portions;

a keyword detection portion configured to detect the keyword included in the obtained information-corresponding-to-keyword, from at least two of three data that are subject-to-be-printed data included in the print job, additional text data added to the subject-to-be-printed data, and a digital watermark embedded in the subject-to-be-printed data; and a sheet feed source selection portion configured to select the sheet feed portion associated with the keyword detected in the information-corresponding-to-keyword, as a feed source of the sheet material for execution of the print job.

* * * * *